(12) United States Patent
Eriksson et al.

(10) Patent No.: US 7,747,371 B2
(45) Date of Patent: Jun. 29, 2010

(54) MOTOR-DRIVEN VEHICLE WITH TRANSMISSION

(75) Inventors: Anders Eriksson, Göteborg (SE); Marcus Steen, Angered (SE); Magnus Blanckenfjell, Göteborg (SE); Anders Lindgren, Göteborg (SE)

(73) Assignee: Volvo Lastvagnar AB, Göteborg (SE)

( * ) Notice: Subject to any disclaimer, the term of this patent is extended or adjusted under 35 U.S.C. 154(b) by 393 days.

(21) Appl. No.: 11/571,525

(22) PCT Filed: Jun. 28, 2005

(86) PCT No.: PCT/SE2005/001035

§ 371 (c)(1),
(2), (4) Date: Dec. 18, 2007

(87) PCT Pub. No.: WO2006/004508

PCT Pub. Date: Jan. 12, 2006

(65) Prior Publication Data
US 2008/0208418 A1 Aug. 28, 2008

(30) Foreign Application Priority Data
Jul. 2, 2004 (SE) .................................. 0401742

(51) Int. Cl.
*G06F 7/00* (2006.01)
(52) U.S. Cl. .................... 701/51; 701/54; 701/87; 477/15; 477/54
(58) Field of Classification Search .......... 701/51, 701/52, 54, 61, 87, 90; 477/15, 54, 160
See application file for complete search history.

(56) References Cited

U.S. PATENT DOCUMENTS

| 3,703,109 A | * | 11/1972 | Irie et al. ................ 477/139 |
| 5,351,540 A | | 10/1994 | Gee |
| 5,748,472 A | | 5/1998 | Gruhle et al. |
| 5,908,461 A | | 6/1999 | Tsukamoto et al. |

FOREIGN PATENT DOCUMENTS

EP 0512596 A1 11/1992

OTHER PUBLICATIONS

International Search Report from corresponding International Application PCT/SE2005/001035.

* cited by examiner

*Primary Examiner*—Gertrude Arthur Jeanglaud
(74) *Attorney, Agent, or Firm*—WRB-IP LLP

(57) ABSTRACT

A motor-driven vehicle includes at least an engine, control devices arranged to control a transmission driven by the engine, a first sensor that is arranged to communicate with the control devices, and a second sensor that is arranged to communicate with the control devices, with the control devices being arranged to receive a first signal sent from the first sensor that includes information about the gradient of the surface on which the vehicle is being driven, and with the control devices being arranged to receive a second signal sent from the second sensor that includes information about torque. The control devices are arranged to correct the first signal in response to the second signal, and to control the transmission in response to the corrected first signal, and thereby compensate for the effect of the torque on the first sensor.

10 Claims, 6 Drawing Sheets

| First gear, G1 | | | |
|---|---|---|---|
| Torque T(i) [Nm] | Nominal gradient SN(i) [%] | Measured gradient SM(i) [%] | Deviation D(i) [%] |
| T(1) | SN(1) | SM(1) | D(1) |
| T(2) | SN(2) | SM(2) | D(2) |
| T(3) | SN(3) | SM(3) | D(3) |
| T(N) | SN(N) | SM(N) | D(N) |
FIG. 3d
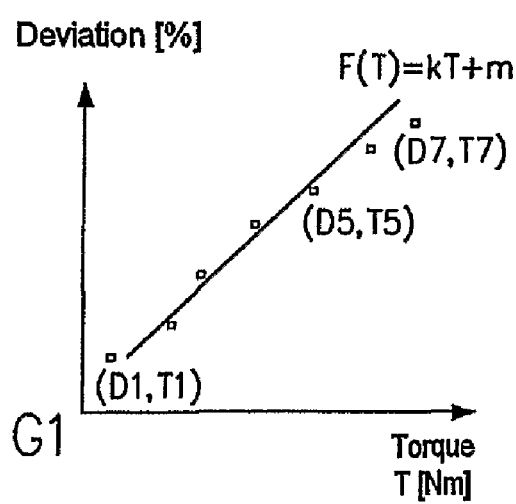
FIG. 3e
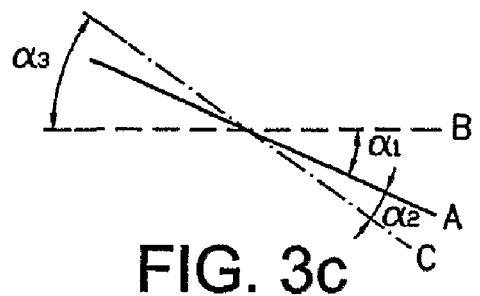
FIG. 3c
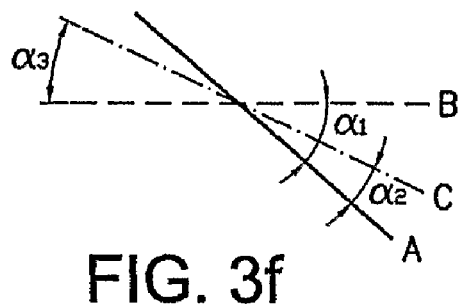
FIG. 3f

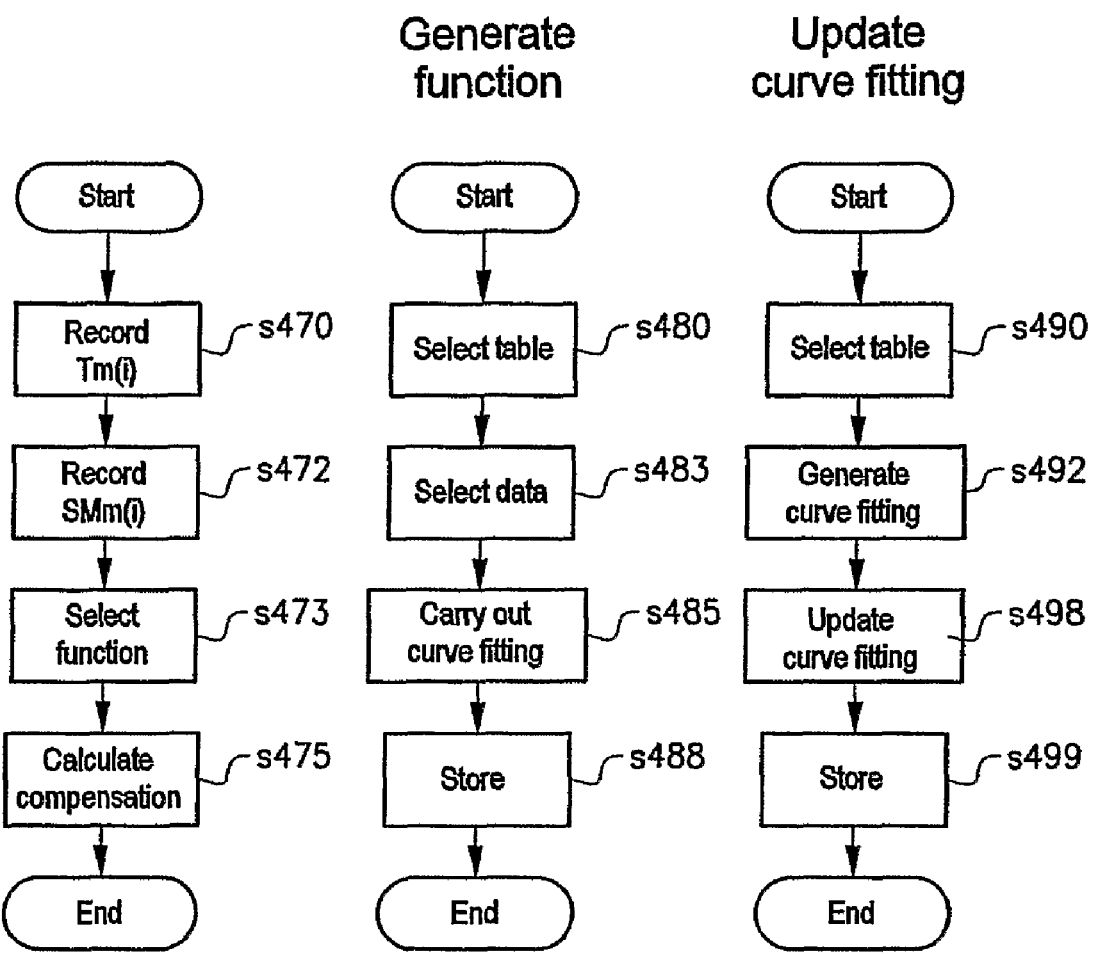

MOTOR-DRIVEN VEHICLE WITH
TRANSMISSION

The present invention relates to a motor vehicle comprising an engine and control devices that are arranged to control a transmission that is driven by the engine.

The invention also relates to a method for detection of the motor-driven vehicle's resistance to travel.

The invention also relates to a computer program for carrying out the said method.

In vehicles with automatic or semi-automatic gearboxes, it is important to use as accurate an estimation as possible of the vehicle's resistance to travel in order to be able to provide optimal gear changing regimes according to certain given criteria, such as, for example, low fuel consumption or high average speed.

EP0512596 describes a method for the control of gear selection in which changing up and down is modified in response to a detected road resistance. A resistance higher than normal can be caused by a trailer, steep gradients or unusual air dynamics. A load equation balances the torque of the outgoing shaft from the transmission against the resistance to travel and provides continually an indication of whether the resistance to travel is higher than normal. EP0512596 describes how the resistance in excess of the normal is used to modify a basic gear change regime in order to provide earlier changing down and later changing up. When the resistance in excess of the normal exceeds a particular, relatively high, value, then changing up is further delayed in order to counteract the detected resistance.

It is desirable to provide a motor vehicle in which a better estimation of the vehicle's resistance to travel is obtained.

It is desirable to obtain in a cost-effective way a better estimation of the gradient of the surface on which the vehicle is being driven.

According to an aspect of the present invention, a motor-driven vehicle comprises at least an engine, control devices arranged to control a transmission driven by the engine, a first sensor that is arranged to communicate with the control devices, and a second sensor that is arranged to communicate with the control devices, with the control devices being arranged to receive a first signal sent from the first sensor that comprises information about the gradient of the surface on which the vehicle is being driven, and with the control devices being arranged to receive a second signal sent from the second sensor that comprises information about torque, with the invention being characterized in that the control devices are also arranged to correct the first signal in response to the second signal, and to control the transmission in response to the corrected first signal, and thereby compensate for the effect of the torque on the first sensor.

The vehicle performs better while being driven, as control of the transmission is based on more correct information. The vehicle can thus, for example, be driven in a more fuel-economic way.

The said correction is preferably carried out in response to a predetermined correction function. In this way, there is an improvement in the accuracy of information that is used as the basis for making decisions for control of the transmission. There is preferably at least one correction function for each gear in the transmission. This has the advantage that there is a further improvement in the accuracy of information that is used as the basis for making decisions for control of the transmission.

BRIEF DESCRIPTION OF THE DRAWINGS

FIG. 3c shows an outline drawing of how the gradient of the surface on which the vehicle is being driven is defined according to an embodiment of the invention.

FIG. 3d shows a table of measured and calculated data that is used according to an embodiment of the invention.

FIG. 3e illustrates a graph of measured and calculated data that is used according to an embodiment of the invention.

FIG. 3f shows an outline drawing of how the gradient of the surface on which the vehicle is being driven is defined according to an embodiment of the invention.

FIG. 4d shows a flow chart illustrating a curve fitting method according to an embodiment of the invention.

FIG. 4e shows a flow chart illustrating a method for compensating for the measured gradient according to an embodiment of the invention.

FIG. 4f shows a flow chart illustrating a curve fitting updating method according to an embodiment of the invention.

DETAILED DESCRIPTION

Figure 1:
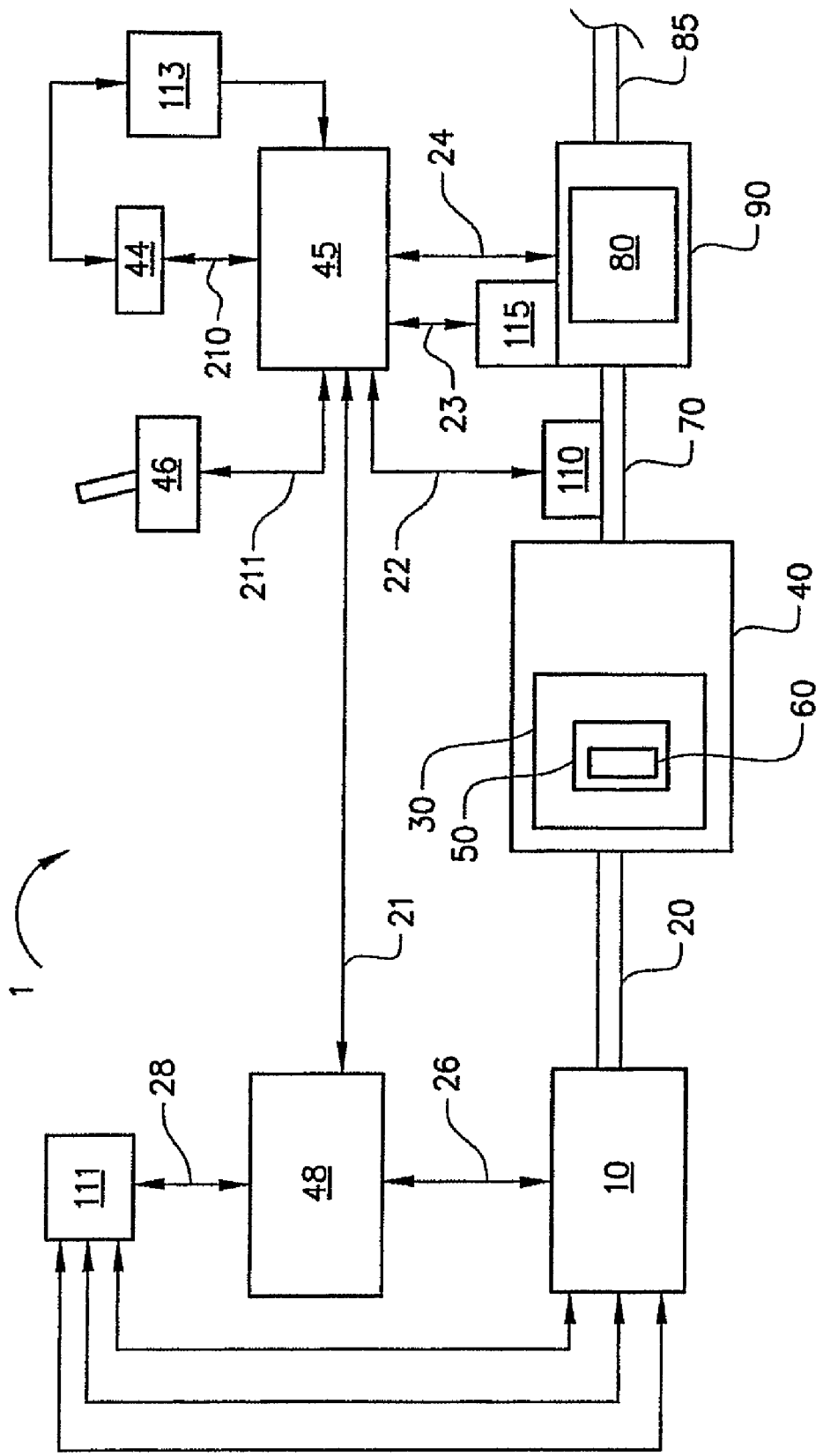
FIG. 1 shows a schematic illustration of a motor-driven vehicle and a control system for the same.

FIG. 1 shows a schematic illustration of a vehicle 1 and a control system for the same according to an embodiment of the present invention in which 10 represents a combustion engine, for example a six-cylinder diesel engine, the crankshaft 20 of which is connected to a single-disk dry disk clutch represented in general by 30, which is enclosed in a clutch case 40. Instead of a single-disk clutch, a double-disk clutch can be used. The crankshaft 20 is connected to the clutch case 50 of the clutch 30 in such a way that it cannot rotate, while its disk 60 is connected to an incoming shaft 70 in such a way that it cannot rotate, which shaft is mounted in the housing 80 of a gearbox represented in general by 90 in such a way that it can rotate. A main shaft and an intermediate shaft are mounted in the housing 80 in such a way that they can rotate. An outgoing shaft 85 from the gearbox 90 is arranged to drive the vehicle's wheels.

In addition, a first control unit 48 for control of the engine 10 and a second control unit 45 for control of the transmission 90 are illustrated. The first and second control units are arranged to communicate with each other via a cable 21. It is described in the following that different processes and method steps are carried out in the second control unit 45, but it should be made clear that the invention is not restricted to this, in that the first control unit 48 can similarly be used, or a combination of the first and second control units. The second control unit 45 is arranged to communicate with the transmission 90 via a cable 24. The first control unit 48 is arranged to communicate with the engine 10 via a cable 26. The first and second control units can, in general, be designated as control devices.

The vehicle 1 has a throttle 44 and a manual gear selector 46, which are arranged to communicate with the second control unit 45 via a cable 210 and 211 respectively. The gear selector 46 can have a position for manual change of gear and a position for automatic change of gear in the vehicle. The throttle can be an accelerator pedal. A sensor 113 is arranged to measure continually the position of the throttle. The sensor 113 is arranged to communicate with the second control unit 45 and hence also with the first control unit 48. The position of the throttle indicates implicitly the quantity of fuel that is supplied to the engine's combustion chamber. The quantity of fuel supplied indicates the engine torque. The second control unit 45 can thus continually calculate a value representing the engine torque on the basis of the signal sent from the sensor 113.

Detectors 111 are arranged to detect, measure, estimate or record different states of, among other things, the engine 10. The detectors can be of different kinds. Examples of detectors are engine torque sensors 111a, acceleration sensors 111b and engine output sensors 111c. In FIG. 1, detectors are only shown in general represented by 111. The detectors 111 are arranged to communicate with the first control unit 48 by means of a cable 28.

According to an embodiment, a torque sensor 110 is arranged to measure the torque of the incoming shaft 70. The torque sensor 110 is arranged to measure the torque that is achieved by the engine 10 on the incoming shaft 70. The torque sensor 110 is arranged to communicate with the second control unit 45 via a cable 22. The torque sensor 110 is arranged to communicate continually to the second control unit 45 a momentary value representing the torque of the incoming shaft. The communicated value representing the torque of the incoming shaft can be communicated to the second control unit in the form of an electrical signal. The signal can alternatively be an optical signal. The signal can be analog or digital. The second control unit is arranged to convert the received signal in a suitable way, for example by means of an A/D transducer (not shown in the figure).

In an alternative embodiment, the torque sensor 110 is arranged to measure the torque of the outgoing shaft 85. The torque sensor 110 is arranged to measure the torque that is achieved by the engine 10 on the outgoing shaft 85. It should be apparent that the torque sensor that is arranged in this way is arranged to measure torque within a wider range than in the case of measuring the torque of the incoming shaft.

In a preferred embodiment, the torque sensor 110 is located on the incoming shaft as, in this case, it can easily be used for other applications, such as, for example, clutch control. The data received from the torque sensor is recorded in the second control unit 45. The received data which is recorded by the second control unit 45 is stored in a memory in the second control unit. According to an embodiment, data measured by the torque sensor and then stored in the memory in the second control unit 45 relates to torque with associated time stamps. According to an embodiment, momentary torque values T(i) are measured each 100th millisecond (0.1 s) and each estimated value is stored with an associated time stamp R(i). The time stamps R(i) are generated by the second control unit 45, where i is an integer between 1 and N. N is an integer, for example 1000. Table 1 below shows an example of four initial measurements for the transmission's first and lowest gear during throttling of the vehicle, for example during acceleration or engine braking. Corresponding measurements can be carried out for all of the transmission's gears and can be stored in tables in the second control unit 45.

TABLE 1

Measured torque T(i) with respective time stamps R(i).

| (i) | T(i) [Nm] | R(i) [s] |
|---|---|---|
| 1 | 0 | 0.100 |
| 2 | 100 | 0.200 |
| 3 | 200 | 0.300 |
| 4 | 300 | 0.400 |

As the transmission's gear and efficiency are known, the torque of the outgoing shaft 85 of the engine can be continually calculated. As the torque of the outgoing shaft is different for different selected gears, this is taken into account in the calculations. Any additional units that are present are also taken into account, in order to obtain good estimations of the torque. According to an embodiment, data representing calculated values for the torque of the outgoing shaft 85 is stored together with associated time stamps in the memory in the second control unit 45.

According to an embodiment, the engine's torque is calculated on the basis of the quantity of fuel injected into the engine's combustion chamber. The calculation can be carried out in the second control unit. According to this embodiment, this calculated value representing the engine's torque can be used according to the invention.

A gradient sensor 115 is already arranged in association with the gearbox 90. According to a preferred embodiment, the gradient sensor is already arranged in the gearbox 90. The gradient sensor 115 is arranged to measure the gradient of the surface on which the vehicle 1 is located, in particular while it is in motion. The surface can be a road, the gradient of which is measured. The gradient sensor 115 can be of piezoelectrical type. The gradient sensor 115 is arranged to communicate with the second control unit 45 via a cable 23. According to a preferred embodiment, the gradient sensor is arranged to send signals representing the gradient of the surface continually to the second control unit.

According to another embodiment, signals representing the gradient of the surface are sent to the second control unit at certain intervals, for example at intervals of 0.01 seconds or 0.5 seconds.

According to an embodiment, signals representing the gradient of the surface are sent continually from the gradient sensor 115 to the second control unit 45 and are stored there in an array together with respective time stamps, according to the above. The array is stored in the second control unit 45. The array is also referred to as a table.

According to an embodiment, values SM(i) representing the gradient of the surface are measured by means of the gradient sensor 115 each 100th millisecond (0.1 s) and each measured value is stored with a respective corresponding time stamp R(i). The time stamps R(i) are generated by the second control unit 45, where i is an integer. Table 2 below shows an example of four initial measurements for the transmission's first and lowest gear. Corresponding measurements can be carried out for all of the transmission's gears and can be stored in files in the second control unit. Note that the time stamps are the same as described above, with reference to Table 1. Thus, SM(T) and T(T) are measured essentially simultaneously, that is they are a first data pair (i=1) measured after 0.1 seconds (R(T)). SM(2) and T(2) are measured essentially simultaneously, that is they are a second data pair (i=2)

measured after 0.2 seconds (R(2)). In Table 2, the respective measured gradients are not stated explicitly.

TABLE 2

Measured gradient of the surface on which the vehicle is being driven SM(i) with respective time stamps R(i).

| (i) | SM(i) (x, y, z) [%] | R(i) [s] |
|---|---|---|
| 1 | SM(1) | 0.1 |
| 2 | SM(2) | 0.2 |
| 3 | SM(3) | 0.3 |
| 4 | SM(4) | 0.4 |

Figure 2:
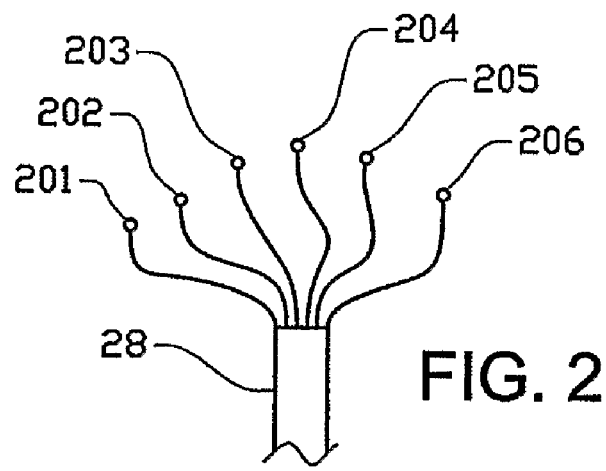
FIG. 2 shows a cable with examples of detected or calculated data, which is used according to the invention.

FIG. 2 shows the cable 28 and examples of motion data detected, measured, estimated or recorded by the detectors 111. Examples of motion data are, for example, engine torque 201, crankshaft torque 202, engine output 203, vehicle's acceleration 204, exhaust gas back pressure 205 and fuel consumption 206.

In addition, detectors 111d (not shown in the figure) are arranged to measure bellows pressure for the vehicle's different wheels.

Figure 3A:
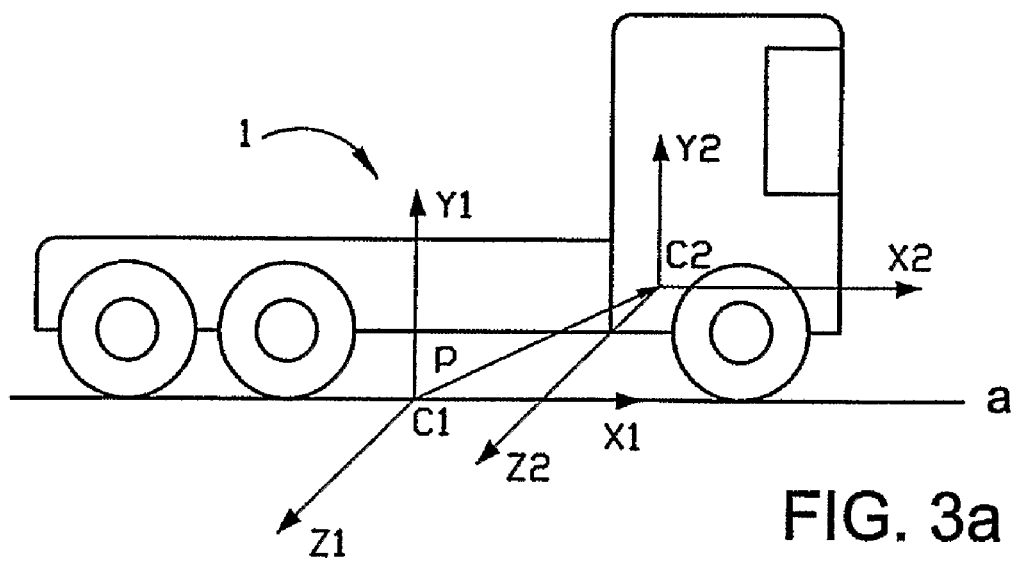
FIG. 3a shows schematically a side view of a motor vehicle that is on a surface.

FIG. 3a illustrates schematically a side view of the motor vehicle 1 comprising, among other things, the engine 1, the control units 45 and 48, the torque sensor 110 and the gradient sensor 115 and other parts shown in FIG. 1.

Two orthogonal coordinate systems are introduced, namely a first orthogonal coordinate system C1(X, Y, Z) and a second orthogonal coordinate system C2(X, Y, Z). The two coordinate systems C1 and C2 are introduced as tools for describing movements in the vehicle's chassis relative to the surface on which the vehicle is being driven caused by a torque in the vehicle's drive line.

The first coordinate system C1(X, Y, Z) has its origin O1 at a specified point located in or outside the vehicle. The second coordinate system C2(X, Y, Z) has its origin 02 in the gradient sensor 115 and is displaced relative to the first coordinate system. The size and direction of the displacement are described by a vector P from O1 to 02. The displacement of the second coordinate system relative to the first coordinate system can be zero (0), that is, there can be no displacement at all. The first coordinate system C1(X, Y, Z) and the second coordinate system C2(X, Y, Z) are described in greater detail below.

Figure 3B:
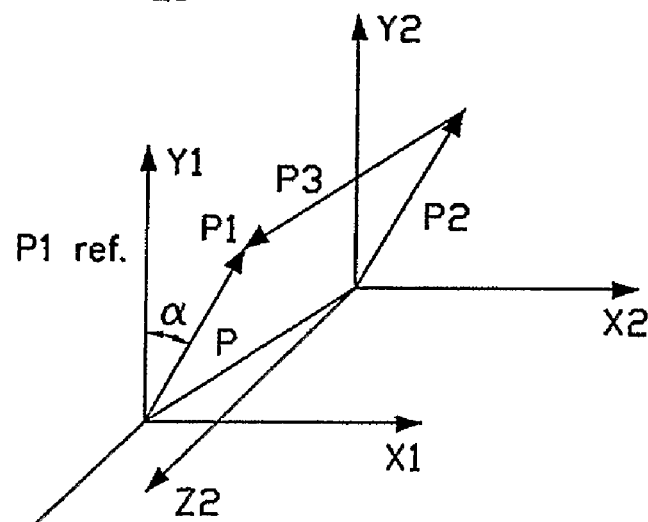
FIG. 3b shows two coordinate systems that are used according to an embodiment of the invention.

FIG. 3b illustrates in greater detail the first coordinate system C1(X, Y, Z) and the second coordinate system C2(X, Y, Z).

The first coordinate system C1(X, Y, Z) has its origin 01 at a specified" point in or outside the vehicle 1. When the motor vehicle is stationary on a flat surface, the X1-axis in the vehicle's direction of travel is parallel with the flat surface. The Y1-axis is orthogonal to the X1-axis (and thus also perpendicular to the flat surface), in an upward direction from the surface. The Z1-axis is orthogonal to both the X1-axis and the Y1-axis and thus points in a direction out from a side of the vehicle. In the figure, the Z1-axis goes in a direction out from the right side of the vehicle, viewed in the direction of travel of the vehicle. The position of the specified point (01) does not change significantly when the vehicle is in motion. It should be apparent that C1 accordingly represents a coordinate system that is always oriented in the way described above for the case when the motor vehicle is stationary on a flat surface.

The surface's momentary gradient is represented by the vector P1 in the first coordinate system C1(X, Y, Z). The first coordinate system has a reference vector P1ref($X_1$, $Y_1$, $Z_1$)=P1(0, 1, 0). The reference vector P1ref($X_1$, $Y_1$, $Z_1$)=P1(0, 1, 0) thus indicates the normal to the surface when the vehicle is stationary on a flat surface. Both P1ref and P1 are unit vectors and have accordingly the length 1.

In ideal conditions, the gradient sensor 115 can measure the gradient of the surface with a relatively high degree of accuracy. Ideal conditions can mean that the vehicle is stationary or is being driven at a constant speed on a horizontal surface. Other ideal conditions can be that the vehicle is freewheeling on an upward or downward incline with a constant gradient. Yet another ideal condition can be when the vehicle is being driven on a varying surface with an interruption in the drive continuity, for example a change of gear. What is common to these conditions is that the gradient sensor is essentially stabilized and can therefore provide a value that is a good representation of the gradient of the surface.

P1 is thus an ideal value (direction) of the gradient sensor that essentially correctly represents the gradient of the surface. On a flat horizontal surface in ideal conditions P1ref and P1 thus coincide.

On a downward incline, however, P1 will follow the surface and indicate the normal to the surface, as shown in FIG. 3b. Assume that the surface is a flat road that has a downward gradient of 5 degrees. The road gradient is represented by a. In FIG. 3b in this case P1=P1($X_1$, $Y_1$, $Z_1$)=P1(sin($\alpha$), cos($\alpha$), 0).

In an alternative embodiment, the direction of P1 is represented by two solid angles $\beta_1$ and $\gamma_1$. $\beta_1$ represents the angle ($0 \leq \beta_1 \leq \pi$) in the X1-Y1 plane $\beta_1$ coincides with X1. $\gamma_1$ represents the angle ($0 \leq \gamma_1 \leq \pi$) in the Y1-Z1 plane where $\gamma_1$=O coincides with Z1. $\beta_1$ and $\gamma_1$ are not shown in the figure.

The second coordinate system C2(X, Y, Z) has its origin 02 located in the centre of the gradient sensor. The respective axes of C1(X, Y, Z) and C2(X, Y, Z) are parallel. This means, for example, that X1 and X2 are parallel. C2 has a vector that starts from 02. P2 is a unit vector and has accordingly the length 1. P2 represents the value that the gradient sensor actually measures, that is, the value that the gradient sensor measures as the gradient of the surface, but that is actually a combination of the gradient of the surface and a twisting in the chassis (and accordingly also a movement of the gradient sensor) that is caused by the torque in the vehicle's drive line.

P2 is thus an incorrect value (direction) representing the surface on which the vehicle is being driven that the gradient sensor 115 measures and sends to the second control unit 48 as a basis for further calculations, such as, for example, a basis for a gear selection strategy. The signal is incorrect in as much as it does not represent a completely correct value representing the gradient of the surface.

In an embodiment, the direction of P2 is represented by two solid angles $\beta_2$ and $\gamma_2$. $\beta_2$ represents an angle ($0 \leq \beta_2 \leq \pi$) in the X2-Y2 plane where $\beta_2$=0 coincides with X2. $\gamma_2$ represents the angle ($0 \leq \gamma_2 \leq \pi$) in the Y2-Z2 plane where Y2=O coincides with Z2. $\beta_2$ and $\gamma_2$ are not shown in the figure.

A vector P3 starts from P1 and points to P2, as shown in the figure.

In the case when O1 and 02 coincide, P3 indicates the relative difference between P1 and P2. This relative difference can be due to a movement of the vehicle's chassis relative to the surface on which the vehicle is being driven that is caused by the torque in the vehicle's drive line.

According to an aspect of the invention, it is recorded how the measured gradient (P2) depends upon the torque of the incoming shaft 70. By utilizing information about how the measured gradient varies as a function of the torque of the incoming shaft 70, a better estimation of the actual gradient of the surface can be obtained. According to an embodiment of the invention, P2 is measured, after which P3 is added to P2 to obtain P1 which is a better estimation of the surface on which the vehicle is being driven. If required, there is also compensation for the displacement between the two coordinate systems C1 and C2 represented by P.

Thus, P1=P2+P3

P3 is obtained by utilizing a curve fitting of a graph that shows how the measured gradient (P2) depends upon the torque T of the incoming shaft 70.

In FIG. 3c, a broken line B illustrates a cross section of a horizontal plane. A solid line A illustrates a cross section of a flat surface that has a gradient ˆradians relative to the horizontal plane B. The solid line A can typically represent a cross section of a flat road on which the vehicle 1 is being driven. The line C, that consists of alternating long and short lines, represents an (incorrect) gradient of the surface B measured by the gradient sensor when the vehicle is being driven on the surface. The measured gradient differs from the actual gradient by azradians. The measured gradient of the surface has a gradient Of 3radians relative to the horizontal plane B.

Thus, α1+α2=α3

Of course, there is the possibility that the measured gradient of the surface is less than the actual gradient, as illustrated in FIG. 3f.

Thus, in this case, α1−α2=α3

FIG. 3d illustrates a table of measured and calculated values according to an embodiment of the invention. In cases when the torque of, for example, the incoming shaft changes rapidly, that is changes a relatively large amount in a short time, the gradient of the surface can be assumed to be constant. In these cases, associated values are recorded from the gradient sensor, that is measured gradient SM(i) and nominal gradient SN(i), and from the torque sensor, that is T(i), as described above. The difference in gradient value D(i) is calculated for the respective associated values and is stored in the table together with the associated torque T(i). D(i) is thus calculated on the basis of SM(i) and SN(i).

In the simplest case, in the event of a change of gear, the torque is reduced to zero (0) and a value representing the difference in gradient can be obtained for a particular torque, that is the torque from which the reduction took place. For example, a deviation between a value SM(i) for the gradient of the surface measured by the gradient sensor 115 and an actual value SN(i) for the same can be 0.7% (in one plane, as shown for example with reference to FIG. 3c) for a torque T(i) corresponding to 1000 Nm.

According to an embodiment of the present invention, in cases where the torque is not zero (0), for example in the event of a sudden torque increase, a previously stored value for the one torque value (SM(i)) can be used as a reference instead of zero (0). In this way, other tables, with different reference values, can be created. These can then be used to create functions that describe the deviation F(T) as described below.

N rows can be stored in the table. N is an integer. N can, for example, be 500.

The table shown in FIG. 3d comprises measured and calculated values for a first gear G1. According to an embodiment of the invention, there are corresponding tables for all the vehicle's gears. Thus, according to an embodiment, where the transmission has 12 different gears, there is a table for each of the transmission's 12 gears. Storage of data in the different tables is carried out as described above. The different tables are designated G1 to G12 for the respective gears.

FIG. 3e illustrates a graph F(T). F(T) is a function that describes how the deviation between the measured gradient of the surface on which the vehicle is being driven and the actual gradient of the surface on which the vehicle is being driven depends on a torque T, for example the torque of the incoming shaft 70. Data D(I), T(I), D(2), T(2), ..., D(7), T(7) is given in the table G1 illustrated with reference to FIG. 3d. According to this embodiment, the graph is obtained by curve fitting to measured data. According to an embodiment, curve fitting can be carried out by the method of least squares, which gives the linear dependency that is shown in FIG. 3e. Here F(T)=kT+m, where k and m are constants. Curve fitting can, however, be carried out in different ways. For example, curve fitting can be carried out with different polynomials. The fitted curve is thus not limited to being a straight line.

According to an embodiment of the invention, a function F(T) is created for each of the tables G1-G12 and is designated F1(T)-F12(T).

Figure 4A:
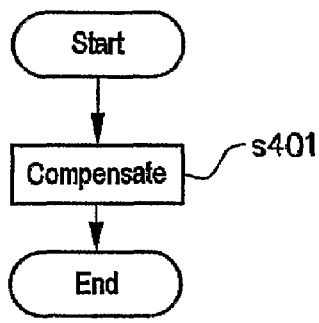
FIG. 4a shows a flow chart illustrating a method according to an embodiment of the invention.

FIG. 4a shows a flow chart illustrating a method for detection of resistance to travel for a motor-driven vehicle according to an embodiment of the invention. According to a first method step s401, the subsidiary steps are carried out of:

receiving a first signal comprising information about the gradient of the surface on which the vehicle is being driven, sent from a gradient sensor;

receiving a second signal comprising information about torque;

where the method is characterized by the subsidiary steps the steps of correcting the first signal in response to the second signal; and of controlling the vehicle's transmission in response to the corrected first signal, and thereby compensating for the effect of the torque on the gradient sensor.

According to an embodiment of the method, the first signal is corrected in response to the second signal comprising information about the torque of an incoming shaft to the vehicle's transmission.

According to an embodiment of the method, the first signal is corrected in response to the second signal comprising information about the torque of an outgoing shaft from the vehicle's transmission.

According to an embodiment of the method, the first signal is corrected in response to the second signal comprising information about the vehicle's engine torque.

According to an embodiment of the method, the first signal is corrected in response to a value representing a quantity of fuel supplied to the engine's combustion chamber.

Figure 4C:
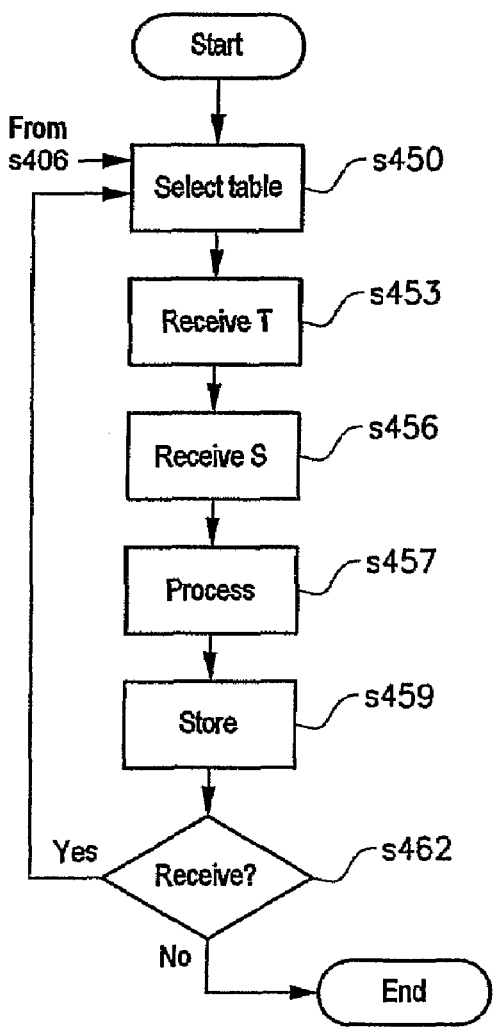
FIG. 4c shows a flow chart illustrating a method for storage of information according to an embodiment of the invention.
Figure 4B:
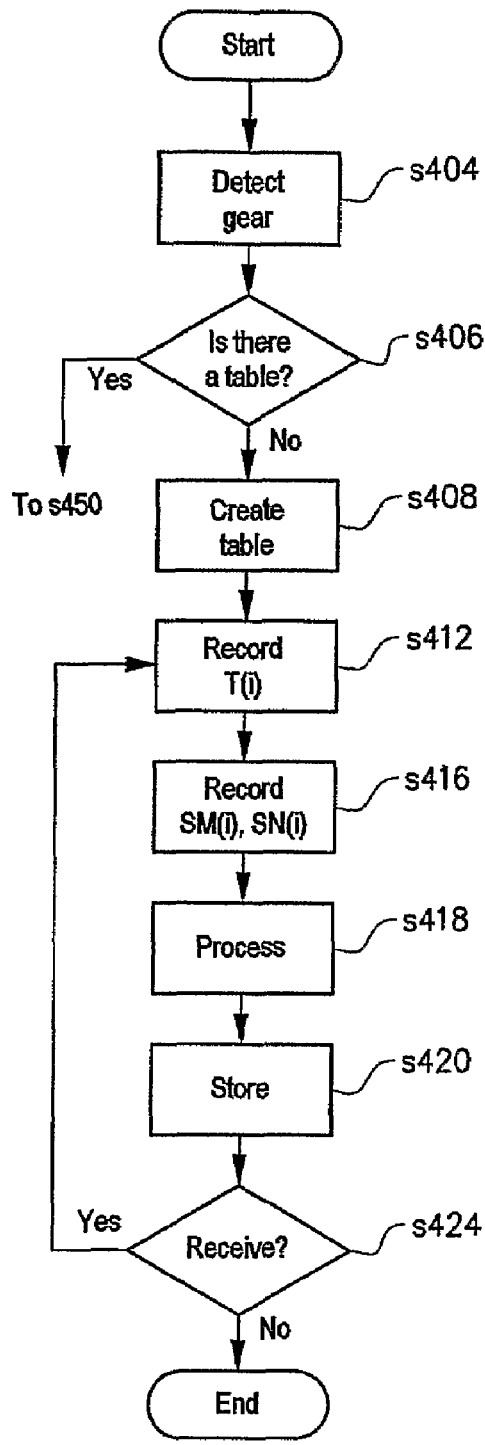
FIG. 4b shows a flow chart illustrating a method for storage of information according" to an embodiment of the invention.

FIG. 4b shows a flow chart illustrating a method for storing data according to an embodiment of the invention. In a first method step s404, it is detected which gear the vehicle's transmission system is in.

In a subsequent method step s406, it is determined whether a table already exists for the detected gear. If such is the case, that is "Yes", a method step s450 follows with reference to FIG. 4c. If there is not already a created table, that is "No", a method step s408 follows.

In method step 408, a table is created for storage of measured data, such as detected torque T(i) and gradient SM(i) and SN(i). The table is intended to store measured or processed data relating to a specific gear in the vehicle's drive line, that is the gear that is detected in the method step s404. The detected gear can be the gearbox's lowest gear, also called a first gear. According to this example, a created table is the one that is shown with reference to FIG. 3d, that is G1. The table is created and is stored in a memory in the second control unit 45. The table is empty after it has been created. The table is dynamic, that is more rows can be created as more measured data is stored. Rows in the table can be created automatically by the second control unit as received data is recorded.

In a method step s412, a value for measured torque T(i) is recorded. According to an embodiment, the recorded value T(i) is a value representing torque upon the initiation of a change of gear. After the method step s412, the method step s416 follows.

In the method step s416, a value SM(i) and corresponding SN(i) are recorded. According to a preferred embodiment, the received value SM(i) is represented by the vector j?2. The method step s416 is followed by a method step s418.

In the method step s418, the deviation D(i) is calculated that gives the difference in gradient between the measured gradient SM(i) and the nominal gradient SN(i). Depending upon how the gradients SM(i) and SN(i) are represented, this can be carried out in different ways. One way is to indicate the difference in gradient D(i) in one plane (the X-Y plane) expressed by an angle α2radians, as shown in FIG. 3c. The method step s418 is followed by a method step s420.

In the method step s420, T(i), SN(i), SM(i) and D(i) are stored in a memory in the second control unit 45, if required also with corresponding time stamp R(i) (not shown in FIG. 3d). The method step s420 is followed by a method step s424.

In the method step s424, a decision is reached whether one of the above procedures is to be repeated, that is whether a new row containing new T(i), SN(i), SM(i) and D(i) for a subsequent time (i+1) is to be inserted in the table. If such is the case, that is "Yes", the method step s412 follows. If such is not the case, that is "No", the method is terminated. A program stored in the second control unit 45 controls the decision making in accordance with certain criteria. FIG. 4c shows a flow chart illustrating a method for storage of data in a table according to an embodiment of the invention.

In the method step s450, a decision is reached concerning which table (for example) G1-12 is to be selected for storage of data T(i), SN(i), SM(i) and D(i) with a particular time stamp. According to a preferred embodiment, the table is selected on the basis of which gear the said data has been detected and calculated for.

In a method step s453, a measured value T(i) is recorded. After the method step s453, the method step s456 follows.

In the method step s456, gradient values SM(i) and SN(i) are recorded, in accordance with s416. After the method step s456, the method step s457 follows.

In the method step s457, the deviation D(i) is calculated, in accordance with s418. After the method step s457, the method step s459 follows.

In the method step s459, T(i), SN(i), SM(i) and D(i) are stored in a memory in the second control unit 45, in accordance with s420. The method step s459 is followed by a method step s462.

In the method step s462, a decision is reached whether one of the above procedures is to be repeated, in accordance with s424. If such is the case, that is "Yes", the method step s450 follows. If such is not the case, that is "No", the method is terminated.

FIG. 4d shows a flow chart illustrating a method for curve fitting according to an embodiment of the invention. In a method step s480, a decision is reached concerning which table is to be selected for generation of a curve fitting (for example, any one of the previously mentioned G1-G12). The decision can be based on the fact that a particular criterion is fulfilled. A criterion can be that the table contains a particular number of rows with data T(i), SN(i), SM(i) and D(i). The method step s480 is followed by a method step s483.

In the method step s483, the data is selected that is relevant for the curve fitting. According to a preferred embodiment, all torque values T(i) and corresponding deviations D(i) are retrieved. In another embodiment of the invention, certain data (T(i) and corresponding deviations D(i)) is selected. In this way, some values can be excluded from the curve fitting procedure. The method step s483 is followed by a method step s485.

In method step s485, a graph is created based on the data selected in method step s483. According to an embodiment, the graph is a function F(T) described above. The method step s485 is followed by a method step s488.

In the method step s488, the graph (or the function F(T)) created in method step s485 is stored in a memory in the second control unit 45. After the method step s488, the method is terminated.

FIG. 4e shows a flow chart illustrating a method for compensating for measured gradients according to an embodiment of the invention.

In a method step s470, a momentary torque Tm(i) is recorded, for example the torque of the incoming shaft. This momentary torque causes the gradient sensor 115 to measure a value representing the gradient of the surface SMm(i) with a certain deviation F(Tm(i)). Tm(i) and SMm(i) have the same time stamp R(i). According to an embodiment, this momentary torque Tm(i) causes the gradient sensor 115 to measure a value representing the gradient of the surface P2 with a certain deviation P3 from the more correct value P1. According to an embodiment, this momentary torque Tm causes the gradient sensor 115 to measure a value representing the gradient of the surface U3 with a certain deviation $\alpha_2$ from the more correct value $\alpha_1$. The method step s470 is followed by a method step s472.

In a method step s472, SMm(i) is recorded.

In the method step s473, it is selected which curve (or function F(T)) is to be used to calculate a correction for the momentary recorded gradient SMm. The curve is selected on the basis of which gear is selected. The method step s473 is followed by a method step s475.

In the method step s475, a correction is calculated for the measured gradient SMm(i) for the corresponding measured torque Tm(i) using the selected function F(T). This calculated correction is used later by the second control unit to control the changing of gear in the vehicle's transmission. Thus, the measured momentary signal SMm(i) is corrected according to the above in order to be used in calculations for controlling the changing of gear in the vehicle's transmission.

After the method step s475, the method is terminated.

FIG. 4f shows a flow chart illustrating a method for updating one of the functions F1(T) to F12(T) according to an embodiment of the invention.

In a method step s490, a decision is reached concerning which table's G1-12 corresponding function F1(T)-F12(T) is to be updated. In this case, G1 is selected and thus F1(T) is to be updated. The method step s490 is followed by a method step s492.

In method step s492, a new graph F1(T) is created in accordance with s485, with new stored data T(i), SN(i), SM(i) and D(i) also being comprised in the curve fitting.

In the method step s498, the old function F1(T) is updated to the new function F1(T) and becomes the valid function until the next update takes place. The method step s498 is followed by a method step s499.

In the method step s499, the updated function F1(T) is stored in a memory in the second control unit 45. After method step s499, the method is terminated.

Figure 5:
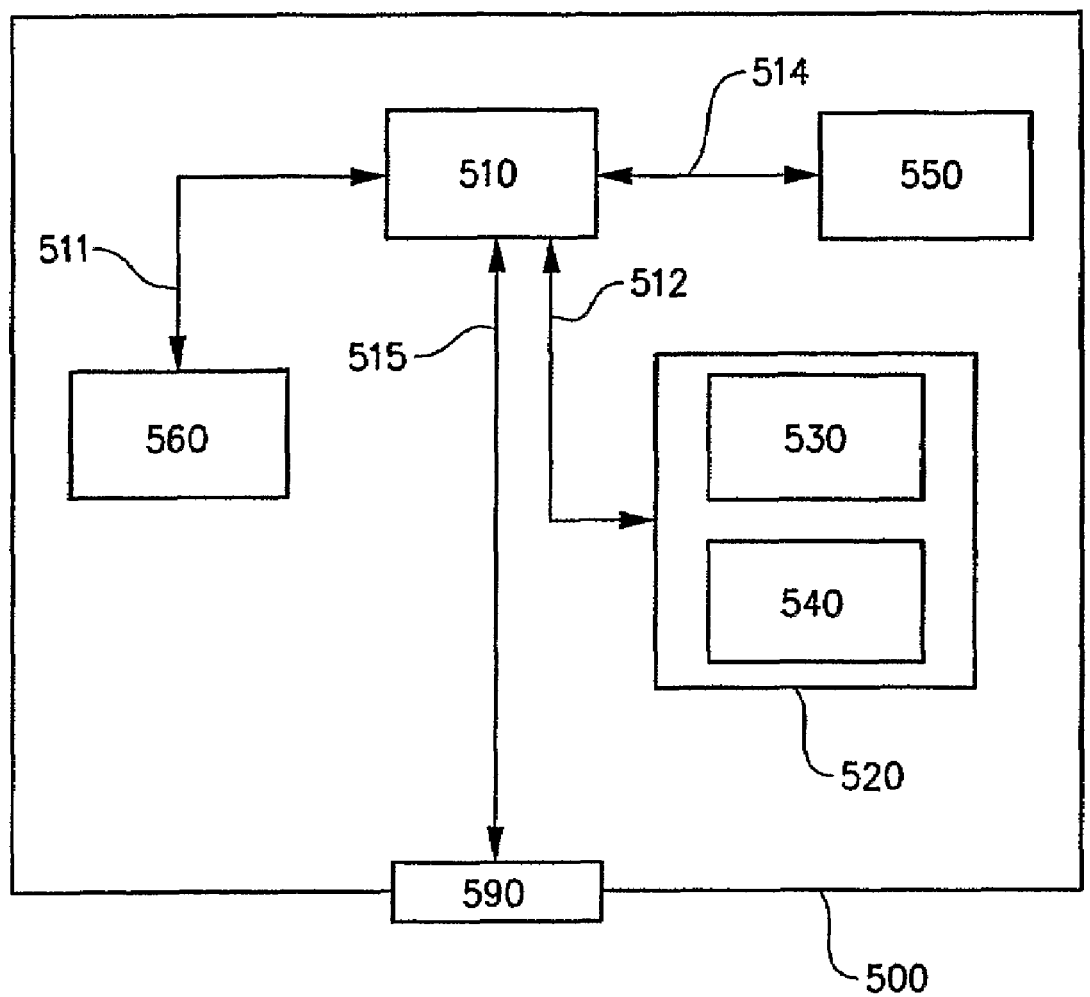
FIG. 5 shows schematically a computer device that is used according to an embodiment of the invention.

FIG. 5 shows an apparatus 500, according to an aspect of the invention, comprising a non-volatile memory 520, a processor 510 and a read and write memory 560. The memory 520 has a first memory module 530, in which a computer program for controlling the apparatus 500 is stored. The computer program in the memory module 530 for controlling the apparatus 500 can be an operating system.

The apparatus 500 can be contained in, for example, a control unit, such as the control unit 45 or 48. According to a preferred embodiment, an apparatus 500 is incorporated in both the first and second control unit 45 and 48 respectively. The data-processing unit 510 can comprise, for example, a microcomputer.

The memory 520 has also a second memory module 540, in which a program is stored comprising methods with reference to the FIGS. 4a-4f. In an alternative embodiment, the program is stored on a separate non-volatile data-storage medium 550, such as, for example, a CD-ROM or a replaceable semiconductor memory. The program can be stored in an executable form or in a compressed state.

When it is described in the following that the data-processing unit 510 runs a special function, it should be clear that the data-processing unit 510 runs a special part of the program which is stored in the memory 540 or a special part of the program which is stored on the non-volatile recording medium 550.

The data-processing unit 510 is arranged to communicate with the memory 550 by means of a data bus 514. The data-processing unit 510 is also arranged to communicate with the memory 520 by means of a data bus 512. In addition, the data-processing unit 510 is arranged to communicate with the memory 560 by means of a data bus 511. The data-processing unit 510 is also arranged to communicate with a data port 590 by means of a data bus 515.

The methods that are described in FIGS. 4a-f can be carried out by the data-processing unit 510 by means of the data-processing unit 510 running the program which is stored in the memory 540 or the program which is stored on the non-volatile recording medium 550.

In the second memory module 540, a computer program is stored comprising program code for carrying out method steps according to the flow charts, with reference to any one of the FIGS. 4a-f, when the said computer program is executed by a computer.

For utilization of the invention, there is a computer program product comprising program code stored on a medium that can be read by a computer for carrying out method steps according to the flow charts, with reference to any one of the FIGS. 4a-f, when the said computer program is executed by the computer. For utilization of the invention, there is a computer program product that can be loaded directly into an internal memory in a computer, comprising a computer program for carrying out method steps according to the flow charts, with reference to any one of the FIGS. 4a-f, when the said computer program product is executed by the computer.

The invention claimed is:

1. A motor-driven vehicle comprising
an engine,
control devices arranged to control a transmission driven by the engine,
a first sensor that is arranged to communicate with the control devices, and
a second sensor that is arranged to communicate with the control devices, wherein the control devices are arranged to receive a first signal sent from the first sensor that comprises information about a gradient of a surface on which the vehicle is being driven, and wherein the control devices are arranged to receive a second signal sent from the second sensor that comprises information about torque, wherein the control devices are arranged to correct the first signal in response to the second signal, and to control the transmission in response to the corrected first signal, and thereby compensate for an effect of the torque on the first sensor.

2. The motor-driven vehicle as claimed in claim 1, wherein the second sensor is a torque sensor that is arranged to measure torque of an incoming shaft to the transmission and/or the torque of an outgoing shaft from the transmission and/or the vehicle's engine torque.

3. The motor-driven vehicle as claimed in claim 1, wherein the first sensor is a sensor that is arranged to measure throttle position, throttle position corresponding to information about a quantity of fuel supplied to the engine.

4. The motor-driven vehicle as claimed in claim 1, wherein the correction is carried out in response to a predetermined correction function.

5. The motor-driven vehicle as claimed in claim 4, wherein there is at least one correction function for each gear in the transmission.

6. A method for detection of resistance to travel for a motor-driven vehicle, with the method comprising the steps of:
receiving a first signal comprising information about a gradient of a surface on which the vehicle is being driven, the first signal being sent from a gradient sensor;
receiving a second signal comprising information about torque;
correcting the first signal in response to the second signal; and
controlling the vehicle's a transmission in response to the corrected first signal, to compensate for an effect of the torque on the gradient sensor.

7. The method as claimed in claim 6, comprising correcting the first signal in response to the second signal comprising information about at least one of torque of an incoming shaft to the vehicle's transmission, the torque of an outgoing shaft from the vehicle's transmission, and the vehicle's engine torque.

8. The method as claimed in claim 6, comprising correcting the first signal in response to the second signal comprising information about a quantity of fuel supplied to the engine.

9. A computer program product comprising program code for carrying out the method steps in claim 6, when the computer program is executed by a computer.

10. A computer program product comprising program code stored on a medium that can be read by a computer for carrying out the method steps in claim 6, when the computer program is executed by the computer.

* * * * *